United States Patent [19]  
Krehbiel et al.

[11] 3,913,674  
[45] Oct. 21, 1975

[54] WATERFLOODING METHOD USING OVERBASED SULFONATE

[75] Inventors: Delmar D. Krehbiel, Lubbock, Tex.; M. Duane Gregory, Ponca City, Okla.; Charles R. Clark, Ponca City, Okla.; Carl D. Kennedy, Ponca City, Okla.

[73] Assignee: Continental Oil Company, Ponca City, Okla.

[22] Filed: Sept. 6, 1974

[21] Appl. No.: 503,829

Related U.S. Application Data

[60] Division of Ser. No. 323,608, Jan. 15, 1973, abandoned, which is a continuation-in-part of Ser. No. 207,988, Nov. 24, 1971, abandoned.

[52] U.S. Cl. ............... 166/270; 166/274; 166/275; 166/305 R
[51] Int. Cl.² ........................................ E21B 43/22
[58] Field of Search .......... 166/270, 273, 274, 275, 166/300, 305 R; 252/8.55 D

[56] References Cited

UNITED STATES PATENTS

| | | | |
|---|---|---|---|
| 3,057,896 | 10/1962 | Schlicht et al. | 260/504 R |
| 3,302,713 | 2/1967 | Ahearn et al. | 166/275 |
| 3,373,808 | 3/1968 | Patton | 166/275 |
| 3,392,782 | 7/1968 | Ferrel et al. | 166/300 |
| 3,398,791 | 8/1968 | Hurd | 166/270 |

*Primary Examiner*—Stephen J. Novosad  
*Assistant Examiner*—George A. Suckfield  
*Attorney, Agent, or Firm*—F. Lindsey Scott

[57] ABSTRACT

An improved anionic water flood additive and method of using same for the recovery of hydrocarbons from a petroliferous formation. The anionic water flood additive is an overbased sulfonate derived from catalytically and/or thermally cracked distillate refinery streams.

11 Claims, No Drawings

WATERFLOODING METHOD USING OVERBASED SULFONATE

This is a division of Ser. No. 323,608 filed Jan. 15, 1973 now abandoned, which is a continuation-in-part of Ser. No. 207,988. filed Nov. 24, 1971, now abandoned.

BACKGROUND OF THE INVENTION

1. Field of the Invention

This invention relates to an improved anionic water flood additive. In one aspect the invention relates to the use of said anionic water flood additive for recovery of hydrocarbons from petroliferous subterranean strata. In yet another aspect, this invention relates to a process for the recovery of viscous oils from low permeability formation by the use of an overbased sulfonate derived from a catalytically and/or thermally cracked distillate refinery stream.

2. Brief Description of the Prior Art

A large percentage of the oil in petroliferous strata is held within the rock of the strata by the surface forces between the rock, the oil and the formation water. As a result, a substantial portion of this oil usually remains in the rock even when wells traversing the strata are no longer productive. Various secondary recovery techniques, such as thermal recovery, gas injection and water flooding, have been suggested for the recovery of this fixed oil which remains in the formation after it can no longer be produced by primary recovery methods. Of these secondary recovery techniques, water flooding is quite commonly chosen, and a multitude of methods has been suggested for improving the efficiency and economy obtained from the practice. Such method frequently includes incorporation of a water-soluble or water dispersable surfactant in the water flood. Typical surfactants which have been proposed for this purpose include alkyl pyridinium salts, sodium lauryl sulfate, certain sulfonates, glycosides, sodium oleates, quaternary ammonium salts and the like. The use of such surfactants has arisen because it is widely recognized that a low interfacial tension between the surfactant flood water and the reservoir crude is essential to the improvement of recovery efficiencies.

Recently it has been proposed that nonionic surfactant solutions, such as a polyoxyethylene-polyoxypropylene copolymer containing solution be injected into the formation through a first of at least two well bores to thereby displace the hydrocarbons towards a second well bore. The nonionic surfactant flood is then followed by the injection of a slug of aqueous caustic into the formation through the first well bore to displace the hydrocarbon and the surfactant toward the second bore. The caustic slug has a basicity at least 1.5 pH levels greater than that of the native formation water. However, the use of the nonionic surfactant has not fully met the needs of a desirable water flood additive surfactant composition and new compositions are constantly being sought which will allow one to recover the residual oil remaining in the formation. Further, the surfactant ingredients of the prior art have suffered from the lack of availability or cost and thus have not satisfied this long-felt need.

OBJECTS OF THE INVENTION

An object of the invention is to provide an improved water flood additive and method for using same in the secondary recovery of hydrocarbons from oil-bearing formations.

Another object of the present invention is to provide an improved water flood additive which is inexpensive and readily available in sufficient quantities to satisfy present and future needs.

Another object of the invention is to provide a water flood additive composition which will be effective in recovering the tertiary oil in the formation and which can be readily processed.

These and other objects, advantages, and features of the invention will become apparent to those skilled in the art from a reading of the following detailed description.

SUMMARY OF THE INVENTION

According to the present invention we have now found an improved anionic water flood additive which comprises an overbased sulfonate derived from a catalytically and/or thermally cracked distillate refinery stream.

Further, according to the invention, we have found that when employing said anionic water flood additive that hydrocarbons in substantial yields can be recovered from petroliferous formations.

One method of employing the anionic water flood additive composition of the present invention includes the step of injecting a slug of the overbased sulfonate derived from a catalytically and/or thermally cracked distillate refinery stream into the formation to thereby displace the hydrocarbon from the formation so that one can recover the displaced hydrocarbon. Additional hydrocarbon can be recovered, if desired, by injecting an effective amount of a slug of aqueous alkali metal hydroxide and/or aqueous alkali metal carbonate into the petroliferous formation after the overbased slug has been injected.

Another method of removing the hydrocarbons from a petroliferous formation is by injecting a first slug of a sulfonate derived from a catalytically and/or thermally cracked distillate refinery stream into the petroliferous formation followed by an effective amount of an aqueous alkali metal hydroxide solution and/or an aqueous alkali metal carbonate solution slug so that the overbased composition is produced in situ by the contacting of the sulfonate slug and the alkali metal hydroxide and/or alkali metal carbonate slug.

DESCRIPTION OF THE PREFERRED EMBODIMENTS

As previously stated, the present invention is an improved anionic water flood additive and a method of using same for the recovery of hydrocarbons from a petroliferous formation. The anionic water flood additive is derived from catalytically and/or thermally cracked distillate refinery streams which are sulfonated to yield sulfonic acid precursors, which when neutralized and overbased produce the anionic water flood additive for use in the present invention. The refinery streams which may be employed are catalytically and thermally cracked distillate streams having boiling ranges within the range of from about 300° to 610°F. For example, a light cycle gas oil stream having a boiling range from about 350°F to about 600°F and an average molecular weight of from about 180 to 205 provides an especially good source material which yields a highly effective mixture of sulfonates upon sulfonation and which, when neutralized and overbased with an aqueous alkali metal hydroxide and/or an aqueous alkali metal carbonate solution constitutes a water flood additive of the present invention. The aromatic content of the light cycle gas oil stream is from about 30 to 65 percent by weight, depending upon the materials charged to the catalytic cracking unit and the crude source from which such materials are derived. The API gravity of light cycle gas oils ranges from about 18 to about 34 and their average UOP K factor is from about 10.5 to 11.5.

TABLE I

| Gravity, °API | 33.4 |
|---|---|
| Distillation, ASTM D-158 | |
| IBP | 420 |
| 5 | 460 |
| 10 | 468 |
| 20 | 471 |
| 30 | 477 |
| 40 | 486 |
| 50 | 495 |
| 60 | 504 |
| 70 | 516 |
| 80 | 530 |
| 90 | 552 |
| 95 | 577 |
| E.P. | 606 |
| Percentage Paraffins and Naphthenes | 54.0 |
| Percentage Olefins | 5.0 |
| Percentage Aromatics | 41.0 |
| UOP "K" Factor | 11.38 |
| C/H Ratio | 7.12 |
| Average Molecular Weight | 196 |
| Kinematic Viscosity at 122°F, Centistokes | 2.20 |

Another cracked stream which may be directly sulfonated to produce a mixture of sulfonic acids, which, when neutralized and overbased with an alkali metal hydroxide and/or aqueous alkali metal carbonate solution as hereinafter described, constitute valuable water flood additive is a stream known in the petroleum refining industry as thermal cycle oil It is also sometimes termed thermal cracked burner distillate. This material may be produced by subjecting to thermal cracking a coker gas oil from a delayed coking unit and/or cycle gas oil from a catalytic cracking unit. Other normally used charge stocks to a thermal cracking unit, such as reduced crude oil, may also be employed. The thermal cracking is carried out in a manner well-understood in the art, such as, for example, subjecting the charge stock to temperatures of about 850° to about 1,200°F and pressures of about 15 psi to about 1500 psi, depending upon whether the thermal cracking is carried out in the liquid phase or in the vapor phase.

Thermal cycle oil produced in the described manner is characterized in having a boiling range of from about 375° to about 600°F and an average molecular weight of from about 160 to about 190. The thermal cycle oil will generally contain from about 40 percent by weight to about 80 percent by weight aromatics. The properties of a typical refinery stream of this material are set forth in Table II.

TABLE II

| Gravity, °API | 28.9 |
|---|---|
| Distillation, ASTM-D-158 | |
| IBP | 352 |
| 5 | 411 |
| 10 | 426 |

TABLE II-Continued

| 20 | 446 |
|---|---|
| 30 | 460 |
| 40 | 472 |
| 50 | 483 |
| 60 | 493 |
| 70 | 506 |
| 80 | 522 |
| 90 | 545 |
| 95 | 569 |
| EP | 612 |
| Percentage paraffins and Naphthenes | 45.0 |
| Percentage Olefins | 6.0 |
| Percentage Aromatics | 49.0 |
| UOP "K" Factor | 11.85 |
| C/H Ratio | 7.15 |
| Average Molecular Weight | 167 |
| Kinematic Viscostiy at 100°F, Centistokes | 1.52 |

Although the fraction of the described refinery light oil and distillate streams which is actually sulfonated may be obtained either prior to the sulfonation step, or, alternatively, by subjecting the unsegregated stream to direct sulfonation and then separating out the sulfonated materials, it is ordinarily preferred to directly sulfonate the described streams and then separate the sulfonated materials from the unreacted materials. Sulfonation procedures are well-known in the art and may be carried out by any one of several methods using as the sulfonating agent either oleum, $SO_3$, mixtures of $SO_3$ and $SO_2$ or chlorosulfonic acid. Furthermore, the sulfonation can be carried out by either a batch-type process or a continuous falling film reactor process.

Neutralization of the sulfonic acids obtained by sulfonation of the above-described refinery stream to produce the alkali metal salts may also be carried out in any one of several methods well-known in the art. Base components are employed in the neutralization step above. The term, base component, as used in this application includes the alkali metal hydroxides and alkali metal salts which are effective to neutralize the sulfonic acid precursors. Examples of such base components include sodium hydroxide, potassium hydroxide, lithium hydroxide, sodium carbonate, potassium carbonate, sodium bicarbonate, and the like. Especially desirable results have been obtained wherein the alkali metal hydroxides are used.

As previously stated, the improved anionic water flood additive of the present invention is an overbased sulfonate derived from a catalytically and/or thermally cracked distillate refinery stream. Overbased sulfonates of this application are comprised of sulfonate plus an excess of base component beyond that required to neutralize the sulfonic acid precursors to the sulfonate, the excess being sufficient that the ratio: "weight of excess base component/weight of sulfonate" is about 0.03 to about 2.0. Particularly desirable results are obtained when the ratio is about 0.20 to about 1.0. Thus, it is apparent that when one neutralizes the sulfonic acids obtained by the sulfonation of the above-described refinery streams and introduces a slug of the neutralized sulfonates into the formation that one must add a sufficient amount of the base component in a second slug to insure that the water flood additive composition formed in situ in the formation is overbased in the prescribed ranges.

In describing the use of the anionic water flood additive of the present invention, two methods of injecting said additive into the petroliferous strata will be discussed. However, it should be understood that neither method is preferred over the other and that the particular method chosen will depend to a large extent upon the facilities available at the well site.

One method of employing the anionic water flood additive composition of the present invention is to inject a slug of the neutralized suflonic acid, i.e., the sulfonate, through a well bore into the petroliferous subterranean strata from which the additional hydrocarbon is to be removed. After the sulfonate slug has thoroughly been dispersed into the strata an effective amount of an aqueous solution of base component in the form of a second slug, is introduced into the strata to allow formation of the overbased water flood additive composition in situ in the subterranean strata. Experimental results have shown that when employing such a method a sufficient amount of the base component containing solution must be injected into the formation to assure that the water flood additive will be overbased sufficiently that the ratio: "weight of excess base component/weight of sulfonate" is about 0.03 to about 2.0. If sufficient base component is not added to reach the lower ratio, desirable results are not obtained. Likewise, problems have been encountered when the amount of overbasing is beyond the upper limit of the ratio, the problems being problems of viscosity and handling of the materials.

The second system which can be employed in using the anionic water flood additive composition of the present invention involves producing the overbased sulfonate and injecting the overbased sulfonate directly into the petroliferous subterranean strata as one slug. When employing this procedure the same limitations as the overbased sulfonate apply as to that desired in the process above. An aqueous mixture of the overbase sulfonate is desirably employed. While the overbased sulfonate derived from a catalytically and/or thermally cracked distillate refinery stream has shown remarkable properties as a water flood additive, additional tertiary oil can be recovered by injecting an effective amount of an aqueous solution of base component into the formation which has previously been contacted with the overbased sulfonate composition. The amount and concentration of the aqueous base component containing solution employed can vary widely. However, desirable results have been obtained wherein the concentration of the base component in the solution ranges from about 0.5 to 50 weight percent and the amount of solution injected into the formation is from about 10 to 1,000 volume percent, based on the amount of the sulfonate containing slug injected into the formation.

In order to more fully explain the present invention the following examples are given. However, it is to be understood that the examples are not intended to function as limitation on the invention as described and claimed hereinafter.

EXAMPLE I

A series of experiments were conducted to evaluate the oil recovery properties of anionic water flood additive in the present invention. In each experiment 12 × 2 × 2 inches Berea cores were evacuated under vacuum and then saturated with 5 weight percent NaCl brine. The brine saturated cores were reduced to irreducible water saturation with 80 Pale oil and then water flooded to residual oil saturation with a 5 weight percent sodium chloride brine aqueous solution. Two percent pore volume slugs of various water flood additives (calculated on the basis of additive per se) were injected into the cores as 2–15 percent by weight of additive in aqueous mixture (except for the cationic additive which was injected per se) and the tertiary water flood was conducted at 40 cc/hour, a flow rate equivalent to 6–7 feet per day to determine their effectiveness as oil recovery additives. The overbased anionic water flood additive compositions employed were prepared by sulfonating the desired cracked distillate refinery stream and then adding 50 weight percent of NaOH to the neutralized sulfonic acids derived from said streams so that the final additive composition contained the equivalent to about 4 percent excess of the hydroxide, and 2–15 percent by weight of sulfonate. All of the oil recovery runs were conducted at 130°F. The results of the experiments are tabulated below:

TABLE I

| Surfactant | Excess NaOH (Wt.%) | Ratio[3] | Volume of Tertiary Oil Recovered (% of Pore Volume) |
|---|---|---|---|
| Nonionic[1] | 4 | 0.3 | 0.2 |
| Cationic[2] | 4 | 1.6 | 0 |
| Sulfonate of Lt. Cycle Gas Oil | 4 | 0.26 | 5.7 |
| Sulfonate of Lt. Cycle Gas Oil | 0 | 0 | 0.9 |
| Sulfonate of Thermal Cycle Oil | 4 | 0.26 | 7.6 |
| Sulfonate of Thermal Cycle Oil | 0 | 0 | 1.9 |

[1]Octylphenoxypolyethoxyethanol
[2]Oil-soluble quaternary ammonium chloride - Because of solubility problems the NaOH was added as a separate slug behind the cationic surfactant.
[3]The ratio involved is: weight percent of excess NaOH/weight of surfactant.

From the above data it is readily apparent that the anionic water flood additive composition of the present invention can be employed for the recovery of the tertiary oil whereas nonionic and cationic compositions have only minor affect. Further, the data clearly shows the criticality of the overbase concept herein before discussed.

EXAMPLE II

A series of experiments were conducted to determine the amount of overbasing required to produce the desired anionic water flood compositions for the improved tertiary oil recovery properties. In each experiment the same procedure employed in Example I was used except that the amount of overbasing was varied. The results of such experiments are tabulated herein below.

TABLE II

| Surfactant | Excess NaOH (Wt.%) | Ratio[3] | Volume of Tertiary Oil Recovered (% of Pore Volume) |
|---|---|---|---|
| Thermal Cycle Oil | 12 | 0.8 | 7.2 |
| Thermal Cycle Oil | 4 | 0.27 | 7.6 |
| Thermal Cycle Oil | 0 | 0 | 1.9 |
| Thermal Cycle Oil | 0.3 | 0.02 | 1.9 |
| Light Cycle Gas Oil | 0 | 0 | 0.9 |
| Light Cycle Gas Oil | 0.4 | 0.027 | 0.9 |
| Light Cycle Gas Oil | 4 | 0.27 | 5.7 |

The above data clearly indicates that a neutralized sulfonic acid derivative of thermal cycle oil and light cycle gas oil does not possess the desired oil recovery properties whereas an overbased sulfonate derived from same does possess the desired oil recovery properties.

Having thus described the invention, we claim:

1. A method for recovering hydrocarbons from a petrolifierous formation which comprises injecting into said formation an effective amount of an anionic water flood additive which comprises an overbased sulfonate of a cracked refinery distillate stream in which said overbased sulfonate contains an excess of base constituent required to neutralize the sulfonic acid precursor of said sulfonate such that the ratio: "weight of excess base component/weight of sulfonate" is about 0.03 to about 2.0, and withdrawing hydrocarbon from said formation which has been displaced by said anionic water flood additive.

2. The method of claim 1 wherein said cracked refinery distillate stream has a boiling range of from about 300° to 610°F and the base component employed to neutralize and overbase said sulfonic acid precursor is selected from the group consisting of an alkali metal hyroxide and an alkali metal carbonate.

3. The method of claim 2 wherein said cracked refinery distillate stream is selected from the group consisting of a light cycle oil and thermal cycle oil.

4. The method of claim 3 wherein the ratio is about 0.20 to about 1.0.

5. The method of claim 4 wherein said base component is selected from the group consisting of NaOH, LiOH, KOH, Na$_2$CO$_3$, and K$_2$CO$_3$.

6. The method of claim 5 which includes the step of injecting into said formation subsequent to said anionic water flood additive an additional amount of from about 10 to 1,000 volume percent of said base solution, the volume based on the volume of the sulfonate containing slug injected, said additional injected base component comprising about 0.5 to about 50 weight percent of the total excess base component.

7. The method of claim 1 which includes the steps of forming said anionic water flood additive in situ by the sequential steps of
   a. injecting into said formation an effective amount of a neutralized sulfonic acid derivative of said cracked refinery distillate stream;
   b. injecting into said formation an effective amount of a base component to produce an overbased mixture of said sulfonate and said base component, said overbased mixture containing an excess of base component above that required to neutralize said acid component such that the ratio: "weight of excess base component/weight of sulfonate" is about 0.20 to about 1.0; and
   c. recovering from said formation hydrocarbon displaced by said overbased mixture.

8. The method of claim 7 wherein said cracked refinery distillate stream has a boiling range of from about 300° to 610°F.

9. The method of claim 8 wherein said cracked refinery distillate stream is selected from the group consisting of a light cycle oil and thermal cycle oil.

10. The method of claim 9, wherein said base component is selected from the group consisting of NaOH, LiOH, KOH, Na$_2$CO$_3$, and Li$_2$CO$_3$.

11. In a process for recovering hydrocarbons from petroliferous formations wherein anionic waterflood additives, injected into a formation through well bores, are employed to displace such hydrocarbons from the formations the improvement therein comprising employing an overbased sulfonate as the anionic waterflood additive, said overbased sulfonate being derived from a cracked refinery distillate stream having a boiling range in the range of about 300° to about 610°F and containing an excess of base component required to neutralize the suflonic acid precursor of said sulfonate such that the ratio: "weight of excess base component/weight of sulfonate" is about 0.03 to about 2.0.

* * * * *

UNITED STATES PATENT OFFICE
CERTIFICATE OF CORRECTION

PATENT NO. : 3,913,674
DATED : October 21, 1975
INVENTOR(S) : Delmar D. Krehbiel et al It is certified that error appears in the above-identified patent and that said Letters Patent are hereby corrected as shown below:

Column 7, line 33, $Na_2CO_3$, and $K_2CO_3$ should read

-- $Na_2CO_3$, $Li_2CO_3$ and $K_2CO_3$.

Column 8, line 26, $Na_2CO_3$, and $Li_2CO_3$ should read

-- $Na_2CO_3$, $K_2CO_3$ and $Li_2CO_3$ -- .

Signed and Sealed this thirtieth Day of March 1976

[SEAL]

Attest:

RUTH C. MASON
Attesting Officer

C. MARSHALL DANN
Commissioner of Patents and Trademarks